United States Patent
Uhling et al.

(10) Patent No.: US 10,763,992 B2
(45) Date of Patent: Sep. 1, 2020

(54) TECHNIQUES FOR MAINTAINING NETWORK CONNECTIVITY IN WIRELESS MESH NETWORKS

(71) Applicant: ITRON, INC., Liberty Lake, WA (US)

(72) Inventors: Thomas Uhling, Spokane Valley, WA (US); Imad Jamil, Meudon (FR); Fabrice Monier, Bry sur Marne (FR); Keith Wayne Barnes, Waseca, MN (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 16/024,577

(22) Filed: Jun. 29, 2018

(65) Prior Publication Data

US 2020/0007269 A1   Jan. 2, 2020

(51) Int. Cl.
| | | |
|---|---|---|
| *H04L 1/00* | (2006.01) | |
| *H04L 12/26* | (2006.01) | |
| *H04W 12/06* | (2009.01) | |
| *H04W 84/18* | (2009.01) | |

(52) U.S. Cl.
CPC .......... *H04L 1/0018* (2013.01); *H04L 1/0036* (2013.01); *H04L 43/067* (2013.01); *H04W 12/06* (2013.01); *H04W 84/18* (2013.01)

(58) Field of Classification Search
CPC .................................................. H04L 1/0018
See application file for complete search history.

(56) References Cited

U.S. PATENT DOCUMENTS

| | | | |
|---|---|---|---|
| 7,392,053 B1 | 6/2008 | Conner et al. | |
| 2007/0066315 A1* | 3/2007 | Kado | H04L 45/00 455/445 |
| 2008/0031155 A1* | 2/2008 | Korus | H04L 63/20 370/254 |
| 2008/0080475 A1 | 4/2008 | Orth et al. | |
| 2008/0181127 A1* | 7/2008 | Terry | H04W 52/0212 370/252 |
| 2008/0279204 A1 | 11/2008 | Pratt, Jr. et al. | |
| 2009/0059814 A1 | 3/2009 | Nixon et al. | |
| 2010/0226342 A1 | 9/2010 | Colling et al. | |
| 2013/0124763 A1* | 5/2013 | Kessler | G06F 13/4295 710/110 |
| 2013/0170336 A1* | 7/2013 | Chen | H04L 12/44 370/221 |

(Continued)

OTHER PUBLICATIONS

International Search Report for application No. PCT/US2019/035698 dated Aug. 19, 2019.

*Primary Examiner* — Kevin M Cunningham
(74) *Attorney, Agent, or Firm* — Artegis Law Group, LLP

(57) ABSTRACT

A wireless mesh network includes a plurality of nodes coupled together in parent-child relationships. A child node is configured to cascade listening rate changes upstream to a parent node to perform low-latency communications. The child node transmits an authentication message to the parent node indicating the listening rate change. The child node sets a timer and waits for an acknowledgement from the parent node. If the child node receives the acknowledgement, then the child node and the parent node change listening rate to permit low-latency communications. In addition, if the parent node loses network access, the parent node sets a timer and then waits to abandon the child node until after the timer elapses.

20 Claims, 9 Drawing Sheets

(56) References Cited

U.S. PATENT DOCUMENTS

| | | | |
|---|---|---|---|
| 2014/0036702 A1 | 2/2014 | Van Wyk et al. | |
| 2016/0157164 A1* | 6/2016 | Lee | H04W 76/27 370/329 |
| 2016/0337223 A1 | 11/2016 | Mackay | |
| 2017/0019853 A1* | 1/2017 | Ghosh | H04W 52/0216 |
| 2017/0171812 A1* | 6/2017 | Guo | H04W 52/0212 |
| 2017/0188409 A1* | 6/2017 | Lee | H04W 76/19 |
| 2017/0201940 A1* | 7/2017 | Koratekere Honnappa | H04W 52/0206 |

\* cited by examiner

TECHNIQUES FOR MAINTAINING NETWORK CONNECTIVITY IN WIRELESS MESH NETWORKS

BACKGROUND

Field of the Various Embodiments

Embodiments of the present invention relate generally to wireless network communications and, more specifically, to techniques for maintaining network connectivity in wireless mesh networks.

Description of the Related Art

A conventional wireless mesh network includes a plurality of nodes configured to communicate with one another. In certain types of heterogeneous wireless mesh networks, different types of nodes communicate and interact with one another within the network, including mains powered device (MPD) nodes and battery-powered device (BPD) nodes. MPD nodes typically are coupled to a power grid and have continuous access to power (except during power outages), which allows MPD nodes to receive and transmit data more or less continuously. On the other hand, BPD nodes are powered by batteries and therefore have only a finite supply of power. To manage the finite supply of power, BPD nodes normally remain in a powered-down state and power on only at intermittent intervals.

During operation, both MPD nodes and BPD nodes communicate using a technique known as "channel hopping." With channel hopping, a given node periodically transitions between different channels. The particular sequence of channels across which a given node transitions is referred to as a "channel hopping sequence." A given node normally receives transmissions only on the current channel in a particular channel hopping sequence; therefore, other nodes typically transmit data to the given node based on the particular channel hopping sequence. When receiving transmissions on a particular channel in the hopping sequence, the given node intermittently receives or "listens" on that channel with a periodicity referred to as the "listen rate." Other nodes account for the listening rate of the given node so that transmitted data arrives when the given node is expected to be listening.

During initialization, MPD nodes and BPD nodes perform a discovery process to determine the channel hopping sequences and listening rates of adjacent nodes within the wireless mesh network. This information allows adjacent nodes within the wireless mesh network to establish communication links or "pair" with one another. Because MPD nodes can operate continuously, pairing with MPD nodes is considerably easier than pairing with BPD nodes, which are powered down far more often than not. Accordingly, when a given BPD node is operational, the BPD node preferentially pairs with a nearby MPD node in order to quickly gain access to the mesh network. Among other things, quickly completing the discovery process conserves battery life because the discovery process can consume quite a bit of power. In many operating scenarios, though, a BPD node cannot quickly locate a nearby MPD node during the discovery process. For example, a BPD node could reside at the fringes of a wireless mesh network where communications with centrally-located upstream MPD nodes are difficult or impossible. To address this type of situation, a given BPD node can be configured to automatically discover and pair with an upstream BPD node that has already gained network access.

In some situations, the automatic discovery process mentioned above results in network topologies where multiple BPD nodes are chained together in a sequence. For example, an upstream "parent" BPD node could provide network access to one or more downstream "child" BPD nodes. Any of those child BPD nodes could, in turn, operate as parent nodes for other downstream BPD nodes. This "daisy-chaining" approach enables even distant BPD nodes to gain network access via one or more intermediate BPD nodes coupled to an upstream MPD node. However, this approach suffers from at least two drawbacks.

First, upon joining the wireless mesh network, a BPD node often needs to perform an authentication procedure that involves communicating with a network management entity residing outside of the network. The authentication procedure typically has to be completed within a short time window. However, when a given BPD node is able to communicate with the network management entity only through multiple intermediate nodes, the authentication procedure usually cannot be completed within that short time window. When a BPD node cannot complete the authentication procedure within the allocated time, that BPD node is denied network access, and the BPD node then has to repeat the discovery process. As noted above, the discovery process consumes power, so repeating the discovery process shortens the operational lifetime of the BPD node.

Second, a BPD node that operates as a parent node may temporarily lose network access under various circumstances. For example, suppose a parent BPD node is coupled downstream to one or more child BPD nodes and coupled upstream to an MPD node configured to provide network access. If the MPD node reboots, then the parent BPD node would lose network access and immediately terminate communication links with all child BPD nodes, causing those child BPD nodes to lose network access as well. To regain network access, all of these different BPD nodes must repeat the discovery process and, as explained above, must expend valuable battery power doing so.

As the foregoing illustrates, what is needed in the art are more effective techniques for maintaining network connections within a wireless mesh network.

SUMMARY

Some embodiments include a computer-implemented method for increasing listen rates of nodes within a wireless mesh network to reduce communication latencies, including determining that a latency associated with communications across a plurality of intermediate nodes within the wireless mesh network should be reduced, in response to determining that the latency should be reduced, increasing a first listen rate of a first node within the wireless mesh network from a first value to a second value, transmitting a first packet to a first intermediate node included in the plurality of intermediate nodes, wherein the first packet indicates the second value and causes the first intermediate node to increase an associated listen rate from the first value to the second value, and executing a packet exchange across the plurality of intermediate nodes, wherein increasing the second listen rate reduces the latency associated with communications across the plurality of intermediate nodes.

At least one advantage of this technique is that BPD nodes can reduce network latency sufficiently to allow the completion of authentication procedures that must be performed within a limited time span. Accordingly, the disclosed technique provides at least one advancement over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted, the above-described discovery process oftentimes results in network topologies where a given BPD node operates as a parent node for a child BPD node that, in turn, operates as a parent node for another child BPD node. However, two specific situations sometimes arise which can cause BPD nodes organized into such topologies to lose network access.

First, a child node may need to perform low-latency communications via one or more intermediate nodes. However, each intermediate node induces an amount of latency that can cause low-latency communications to be difficult or impossible. This situation is especially problematic for child nodes which need to perform an authentication procedure within a limited time window. If such nodes cannot complete the authentication procedure, those nodes may lose network access and be required to repeat the discovery process. Second, a parent node may temporarily lose network access and immediately abandon any child nodes. Those child nodes must then repeat the discovery process. Generally, the discovery process consumes excessive power and so repeating that process should be avoided, if possible.

To address these issues, various embodiments include a BPD node that is configured to cascade listening rate changes upstream to one or more intermediate nodes. The BPD node transmits an authentication message to a parent BPD node indicating the listening rate change. The BPD node sets a timer and waits for an acknowledgement from the parent BPD node. If the BPD node receives the acknowledgement, then the BPD and the parent BPD node change listening rate to permit low-latency communications. In addition, if the parent BPD node loses network access, the parent BPD node sets a timer and then waits to abandon any child BPD nodes until after the timer elapses.

At least one advantage of these techniques is that BPD nodes can reduce network latency sufficiently to allow the completion of authentication procedures that must be performed within a limited time span. Another advantage is that parent BPD nodes do not abandon child nodes immediately upon losing network access, thereby preventing those nodes from needing to unnecessarily repeat the discovery process. Accordingly, the disclosed techniques provide multiple advancements over the prior art.

System Overview

Figure 1:
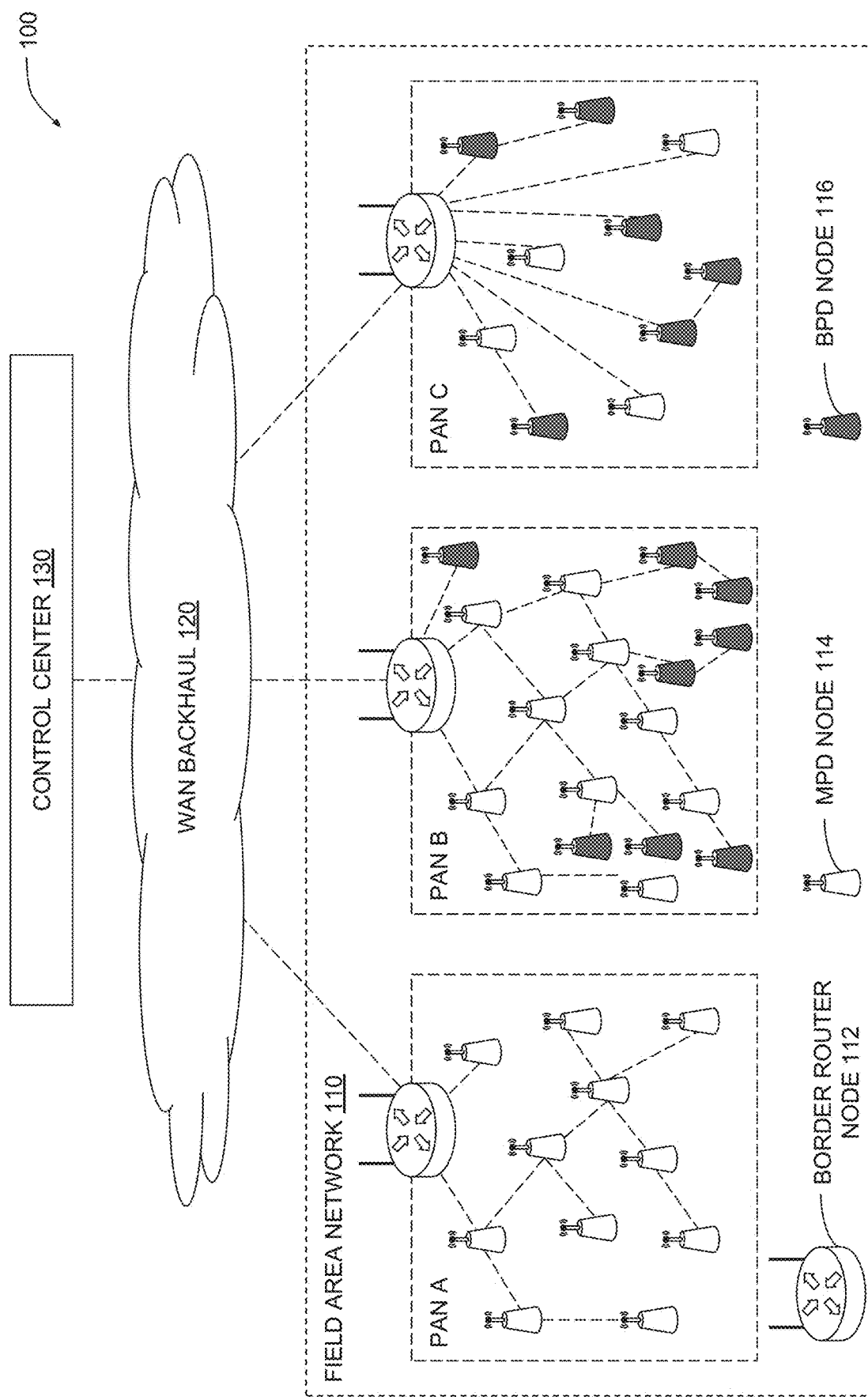
FIG. 1 illustrates a network system configured to implement one or more aspects of the present embodiments.

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120.

Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node. In one embodiment, a node "abandons" another node by removing information associated with the other node from the neighbor table.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node. Time slots and time slot numbers are discussed in greater detail below in conjunction with FIG. 3A.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 120 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
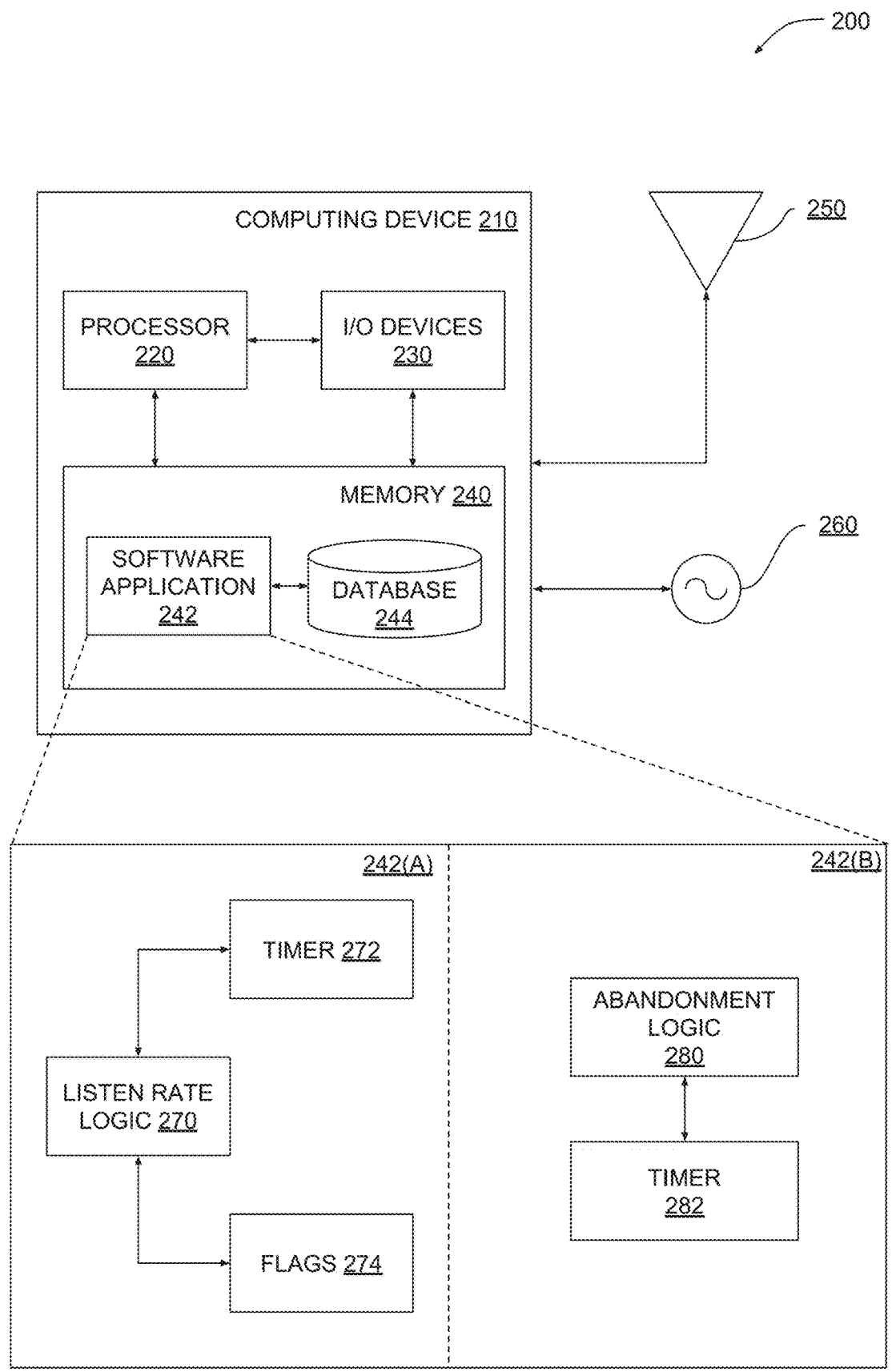
FIG. 2 illustrates a node configured to transmit and receive data within the network system of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node configured to transmit and receive data within the mesh network of FIG. 1, according to various embodiments. As shown, a node 200 includes a computing device 210 coupled to a transceiver 250 and an oscillator 260. Computing device 210 coordinates the operations of node 200. Transceiver 250 is configured to transmit and receive data packets across network system 100 using a range of channels and power levels. Oscillator 260 provides one or more oscillation signals according to which the transmission and reception of data packets can be scheduled. Node 200 may be used to implement any of border router nodes 112, MPD nodes 114, and BPD nodes 116 of FIG. 1.

Computing device 210 includes a processor 220, input/output (I/O) devices 230, and memory 240, coupled together. Processor 220 may include any hardware configured to process data and execute software applications. Processor 220 may include real-time clock (RTC) (not shown) according to which processor 220 maintains an estimate of the current time. I/O devices 230 include devices configured to receive input, devices configured to provide output, and devices configured to both receive input and provide output. Memory 240 may be implemented by any technically feasible storage medium.

Memory 240 includes a software application 242 and database 244, coupled together. Software application 242 includes program code that, when executed by processor 220, performs any of the node-oriented computing functionality described herein. Software application 242 may also interface with transceiver 250 to coordinate the transmission and reception of data packets across network system 100 based on timing signals generated by oscillator 260.

In operation, software application 242 implements the discovery process discussed above in conjunction with FIG. 1 in order to establish adjacency with one or more neighboring nodes. Software application 242 may generate a neighbor table that indicates node adjacency and various other neighbor data, and then store the neighbor table in database 244. Once the discovery process is complete, software application 242 causes node 200 to initiate normal operations. In the course of normal operations, software application 242 implements channel hopping across a repeating sequence of time slots. Software application 242 may cause node 200 to transmit or receive data periodically within these time slots with a periodicity that is referred to herein as the "listen rate" of node 200.

Software application 242 includes submodules 242(A) and 242(B). Submodule 242(A) is configured to initiate a listen rate change for node 200 and one or more other nodes coupled directly or indirectly to node 200. Submodule 242(A) includes listen rate logic 270, timer 272, and flags 274. Listen rate logic 270 initiates a listen rate change by transmitting a data packet to an adjacent node indicating an increased or decreased listen rate. Listen rate logic 270 then starts timer 272 and waits for an acknowledgement (ack) from the adjacent node. Listen rate logic 270 tracks whether the ack arrives using flags 274, and only changes the listen rate of node 200 when the ack arrives. This approach allows node 200 to implement time-sensitive communications by coordinating listen rate increases with adjacent nodes and subsequent listen rate decreases. Node 200 may also implement submodule 242(A) to respond to listen rate change initiated by adjacent nodes. Various processes performed by listen rate logic 270 are described in greater detail below in conjunction with FIGS. 5-6.

Submodule 242(B) is configured to manage communication links with child nodes of the node 200 when network access is lost. In particular, submodule 200(B) determines whether child nodes of node 200 should be retained or abandoned under circumstances where node 200 loses network access. In the context of this disclosure, the term "abandon" means to eliminate a communication link and/or terminate the transmission of beacons. A given node may be said to "abandon" a child node when the given node ceases communicating with the child node and/or terminates the transmission of beacons to that node.

Submodule 242(B) includes abandonment logic 280 and timer 282. Abandonment logic 280 sets timer 282 when network access is lost and retains any child nodes of node 200 until timer 282 elapses or network access is regained. If network access is regained, abandonment logic 280 determines whether network conditions permit the child nodes to be retained. This approach advantageously allows any child nodes of node 200 to avoid needing to repeat the discovery process when node 200 temporarily loses network access, thereby conserving battery power. Various processes performed by abandonment logic 280 are described in greater detail below in conjunction with FIGS. 7-8.

Figure 3A:
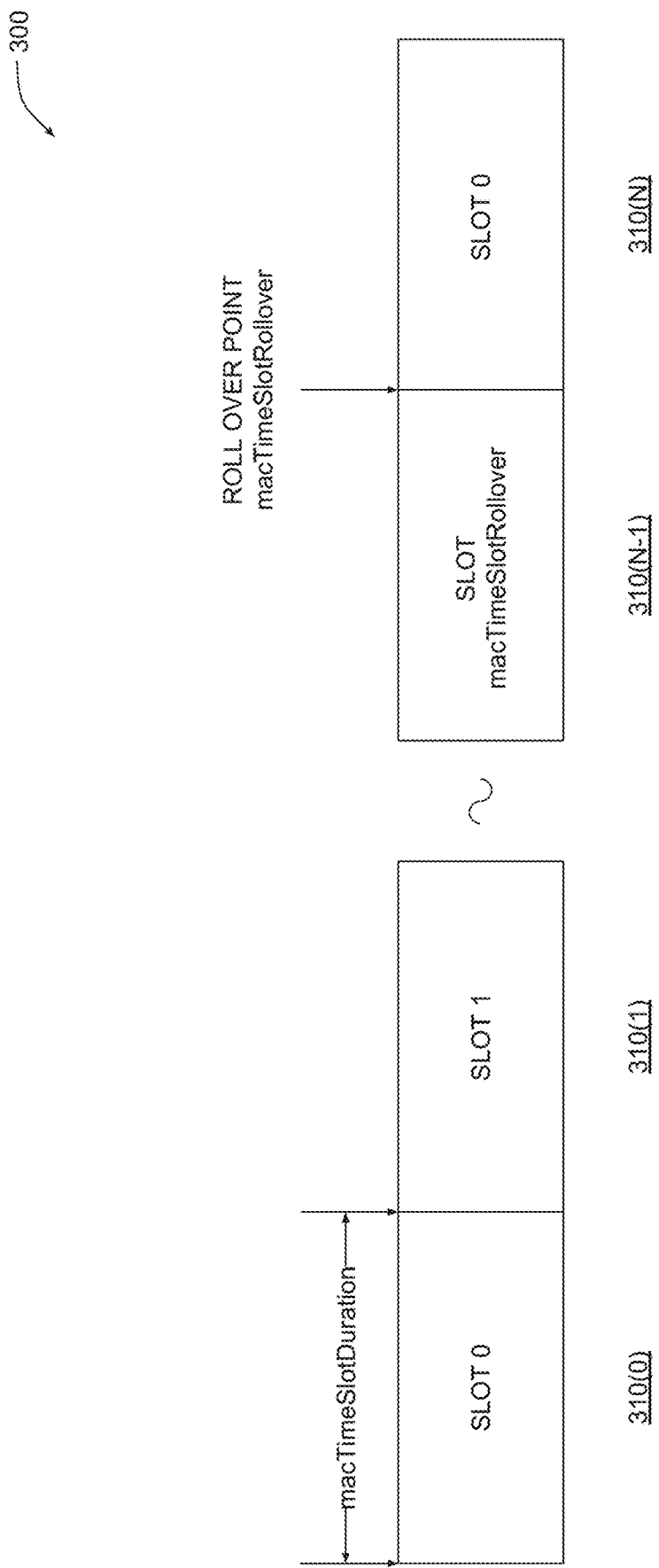
FIGS. 3A-3B illustrate sequences of time slots within which a node of FIG. 1 transmits and/or receives data, according to various embodiments.
Figure 3B:
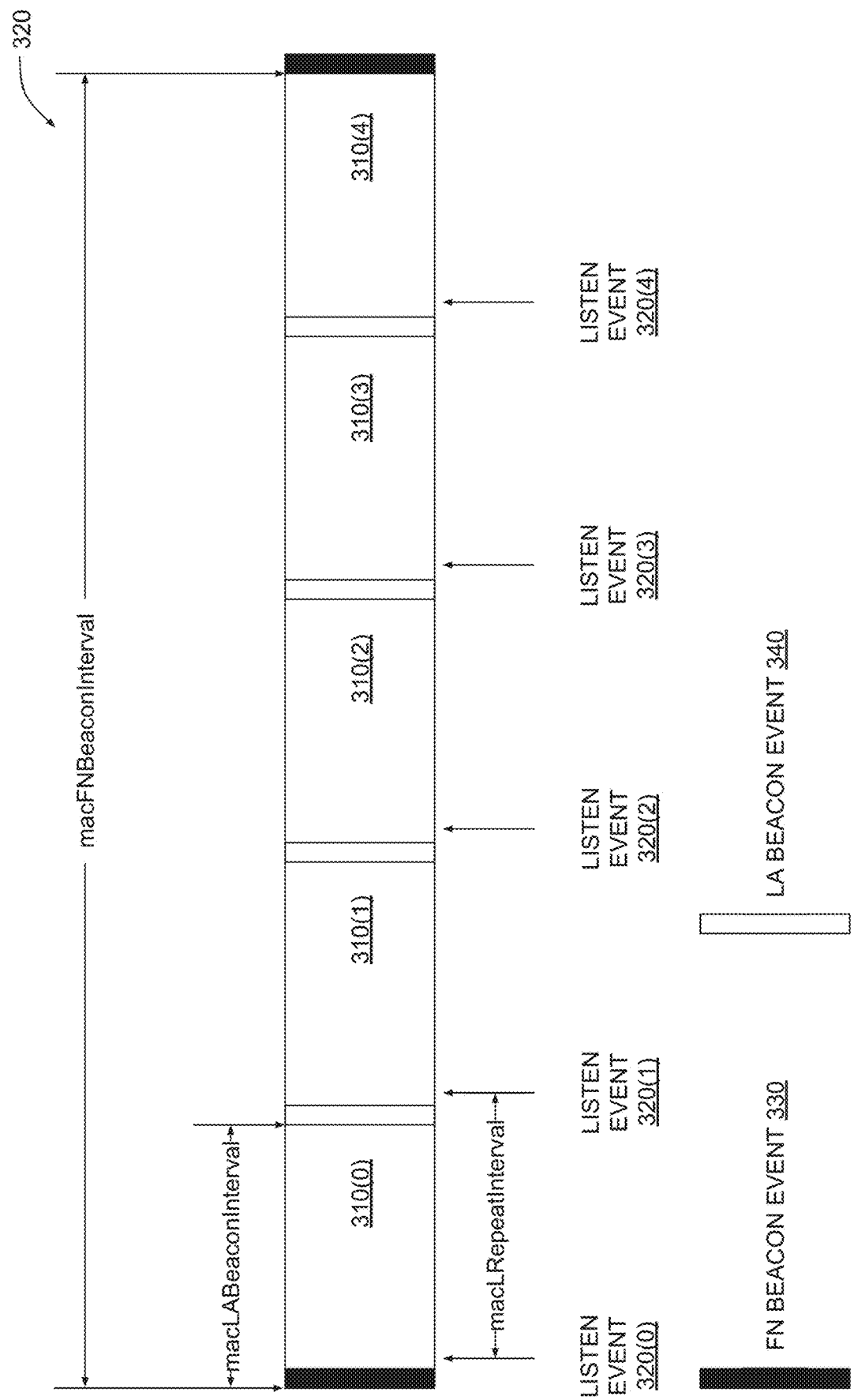

FIGS. 3A-3B illustrate various time slotting techniques implemented by nodes within network system 100 to perform normal communications as well as communications associated with above-mentioned discovery process.

FIG. 3A illustrates a sequence of time slots within which the node of FIG. 2 transmits and/or receives data, according to various embodiments. As shown, a sequence 300 of time slots includes N time slots 310(0) through 310(N), each having a duration of macTimeSlotDuration. A given time slot 310 is associated with a slot number falling within the range of zero to macTimeSlotRollover, where zero is the minimum slot number and macTimeSlotRollover is the maximum slot number. The current slot number increments sequentially over time until macTimeSlotRollover is reached, and then rolls over to zero.

During initialization, the node selects a random starting slot number within the range of available slot numbers and stores this slot number along with a timestamp. The node generates the timestamp based on the above-mentioned estimate of current time maintained by the RTC within processor 210. The node may also store a parts-per-million (PPM) correction factor than can be applied to the estimate of the current time.

At any given time during operation, the node dynamically computes the current slot number as well as the time into the current slot using the estimate of current time and any of the other information discussed above. Based on the current slot number, the node determines a specific channel to associate with the time slot. In this manner, the node may determine a sequence of channels corresponding to a sequence of time slots. This sequence of channels is the above-referenced channel hopping sequence for the node. In embodiments where the node evaluates a Jenkins hash function to compute the current receive channel, as discussed above, the node evaluates this function using the current slot number. FIG. 3B illustrates an exemplary listening schedule associated with a node.

FIG. 3B illustrates a sequence of time slots within which the node of FIG. 2 transmits and/or receives data, according to various embodiments. As shown, sequence 300 of FIG. 3B is expanded to include time slots 310(0) through 310(4). Each time slot 310 includes a listen event 320 and a beacon. In one embodiment, a given time slot 310 includes either a field network (FN) beacon event 330 or a local area (LA) beacon event 340. A given beacon may also include timing information allowing nodes to synchronize RTCs with one another.

During listen events 320, the node may receive data. In particular, within a given time slot 310 and during the corresponding listen event 320, the node may receive data on the channel associated with that time slot. Listen events 320 repeat periodically with an interval of macLRepeatInterval. Listen events 320 have a configurable duration and a configurable offset within a respective time slot 310. During a given listen event 320, the node may receive beacons from adjacent nodes which include timing information associated with those adjacent nodes. A given beacon received from a given adjacent node includes an estimate of the current time and a PPM uncertainty value associated with that estimate. The node generally uses this timing information to maintain communications with the adjacent node, and, more specifically, to re-synchronize channel hopping sequences with the adjacent node. In one embodiment, the node operates as a child of the adjacent node and repeats the discovery process when the adjacent node stops sending beacons to the node.

During either type of beacon event, the node transmits a beacon. For example, the node could transmit FN beacons 330 periodically with an interval of macFNBeaconInterval and transmit LA beacons 340 periodically with an interval of macLABeaconInterval. In one embodiment, the node may implement listen events 320 and various beacon types according to separate schedules that can be enabled or disabled independently of one another.

Referring generally to FIGS. 1-3B, the foregoing techniques permit the various types of nodes within network system 100 to communicate with one another. Persons skilled in the art will recognize that the disclosed techniques may be applicable to any type of network and any type of node beyond those explicitly discussed herein. Further, the techniques described herein are sufficiently flexible to be utilized within any technically feasible network environment or combination of network environments and with any available communication protocols.

Cascading Listen Rate Changes

Figure 4:
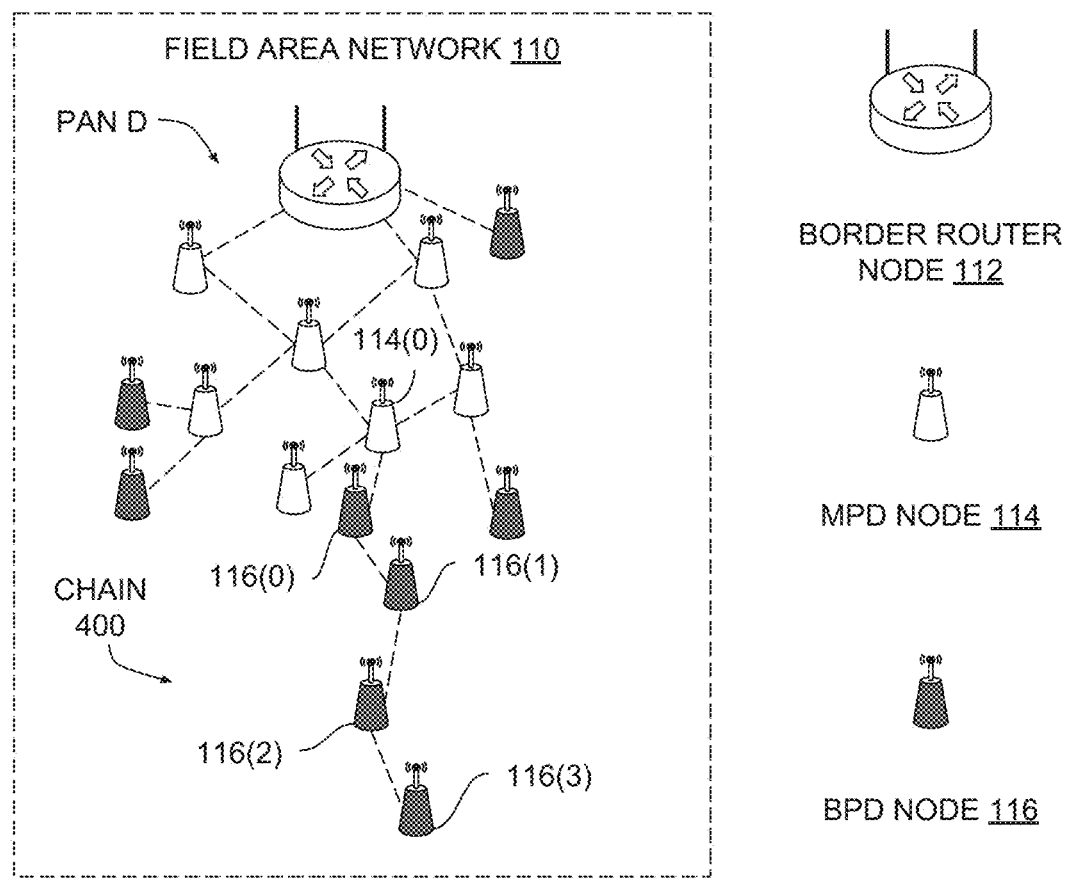
FIG. 4 illustrates a network topology where various nodes of FIG. 1 are "daisy-chained" together, according to various embodiments.

FIG. 4 illustrates a network topology where various nodes of FIG. 1 are "daisy-chained" together, according to various embodiments. As shown, field area network 110 of FIG. 1 further includes a PAN D. PAN D includes a border router node 112, MPD nodes 114, and BPD nodes 116. BPD nodes 116(0) through 116(3) are organized into a chain 400 that is coupled upstream to MPD node 114(0). MPD node 114(0) operates as a parent node for BPD node 116(0). BPD node 116(0) operates as a parent node for BD node 116(1). BPD node 116(1) operates as a parent node for BPD node 116(2). BPD node 116(2) operates as a parent node for BPD node 116(3). A given parent node generally provides network access to an associated child node.

BPD node 116(3) resides at the fringe of PAN D yet is capable of communicating with border router node 112 via intermediate nodes, including those within chain 400. For example, BPD node 116(3) could transmit a data packet to BPD node 116(2), and BPD node 116(2) would relay the data packet upstream to BPD node 116(1). BPD node 116(1), in turn, would relay the data packet upstream to BPD node 116(0), which would then relay the data packet onward to MPD node 114(0). This process would continue until the data packet reaches border router node 112. A similar process could be applied to transmit a data packet from border router node 112 down to BPD node 116(3). As a general matter, any sequence of adjacent nodes can relay a data packet from a source node to a destination node across PAN D.

The speed with which a given data packet traverses PAN D depends on the listen rate of each intermediate node that relays the data packet. As described above in conjunction with FIG. 3A, nodes receive transmissions when executing listen events 320 at periodic intervals having a duration of macLRepeatInterval. Accordingly, a sequence of N intermediate nodes configured to relay a given data packet may require a maximum amount of time equal to N*macLRepeatInterval to relay the data packet across PAN D. Generally, each hop within a chain of intermediate nodes induces an amount of latency derived from macLRepeatInterval. Under normal operating conditions, a chain of intermediate nodes having any length typically can relay data packets with negligible latency.

However, under other operating conditions, a given BPD node 116 may need to communicate with border router node 112 or other network entities much faster than possible under normal operating conditions. For example, BPD node 116(3) could need to perform an extensible authentication protocol over LAN (EAPOL) procedure with a network management entity (not shown) coupled to PAN D. The EAPOL procedure involves the exchange of various authentication packets which would need to be completed before a timeout period. The number of intermediate nodes between BPD node 116(3) and the network management entity could induce sufficient latency to cause the procedure to timeout and fail. When this occurs, BPD node 116(3) could lose network access.

To avoid situations such as that described above, a given child BPD node 116 is configured to coordinate the adjustment of macLRepeatInterval with a parent BPD node 116 upon determining that lower-latency communication is needed. The child BPD node 116 implements this technique to increase the listen rates of intermediate nodes, thereby reducing latency and allowing the EAPOL procedure mentioned above to complete successfully. The child BPD node 116 subsequently decrease those listen rates to return to normal operation. A given child BPD node 116 implements a specific process in order to cause a parent BPD node 116 to change listen rate when performing the EAPOL procedure. This process is set forth in conjunction with FIG. 5. The parent BPD node 116 implements another process to change listen rate when the child node 116 performs the EAPOL procedure. This other process is set forth in conjunction with FIG. 6.

Figure 5:
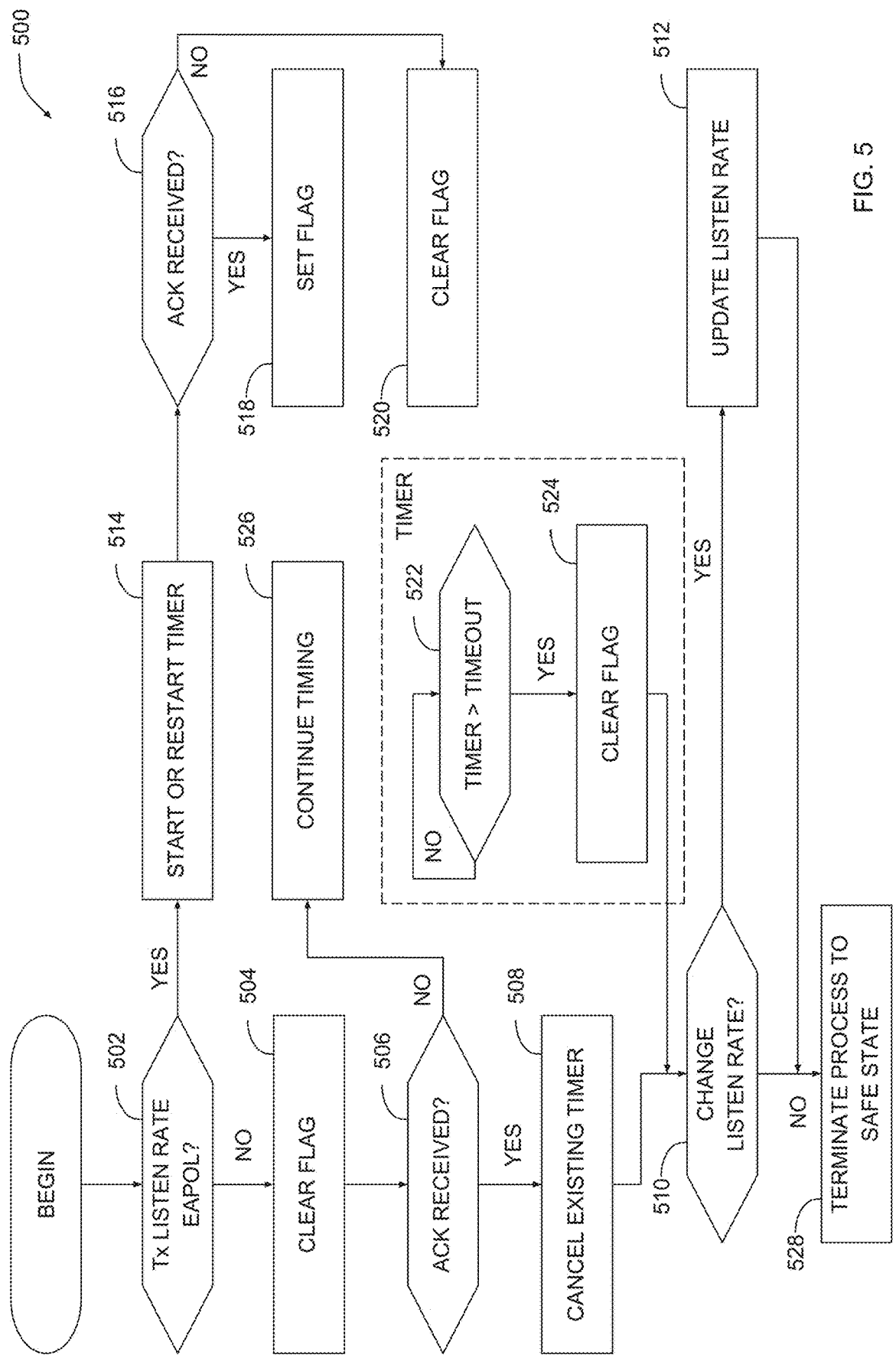
FIG. 5 is a flow diagram of method steps for triggering a parent node to change a listen rate, according to various embodiments.

FIG. 5 is a flow diagram of method steps for triggering a parent node to change a listen rate, according to various embodiments. Although the method steps are described in conjunction with the systems of FIGS. 1-4, persons skilled in the art will understand that any system configured to perform the method steps in any order falls within the scope of the present invention.

As shown, a method 500 begins at step 502, where a child BPD node 116 determines whether to transmit an EAPOL message to a parent BPD node 116 that includes a listen rate change. The child BPD node 116 is configured to include an indication of the listen rate change in EAPOL message headers or the MAC header of any frame in order to conserve data packets and reduce network traffic. The child BPD node 116 may implement this technique when performing other low-latency operations outside of EAPOL, including transmitting other types of authentication requests, among others. The child BPD node 116 adjusts its own listen rate to the listen rate indicated in the EAPOL message. If the child BPD node 116 determines that the EAPOL message is to be transmitted, then the method 500 proceeds to step 514.

At step 514, the child BPD node 116 start or restarts a timer. The timer could be, for example, timer 272 shown in FIG. 2. The timer keeps track of how long the child BPD node 116 should wait before returning the listen rate to the standard listen rate defined by macLRepeatInterval. In one embodiment, the timer is implemented via steps 522 and 524 of the method 500. In this embodiment, step 522 repeats until the timer value exceeds a timeout value. Then, the method 500 proceeds to step 524 where the child BPD node 116 clears the flag.

At step 516, the child BPD node 116 determines whether the ack is received. If the ack is received, then the method 500 proceeds to step 518 where the child BPD node 116 sets a flag. The flag tracks whether the ack has been received, indicating that the parent BPD node 116 has changed listen rate. If the ack is not received, then the method 500 proceeds to step 520 where the child BPD node 116 clears the flag. The absence of the flag indicates that no ack was received. The flag could be included, for example, within flags 274 shown in FIG. 2. After the child BPD node 116 performs the above steps, the child BPD node 116 may return to and repeat step 502.

At step 502, the child BPD node 116 again determines whether to transmit the EAPOL message to the parent BPD node 116. If the EAPOL message has already been sent in the manner described above, then the method 500 proceeds to step 504. At step 504, the child BPD node 116 clears the flag. The flag may have been set via step 518 or may have been cleared via step 520. In either case, following step 504, the flag is cleared. At step 506, the child BPD node 116 determines whether the ack has yet been received from the parent BPD node 116. In one embodiment, the parent BPD node 116 may transmit the ack during a unicast exchange process. If the ack has not yet been received, then the method 500 proceeds to step 526 and timing continues. Otherwise, if the ack has been received, then the method proceeds to step 508.

At step 508, the child BPD node 116 cancels the timer for the parent BPD node 116. The method then proceeds to step 510. In embodiments where the timer is implemented via steps 522 and 524, as described above, expiry of the timer can also cause the method 500 to proceed to step 510. At step 510, the child BPD node 116 determines whether to reset the listen rate to the standard listen rate. Generally, if the timer has expired and the child BPD node 116 still operates at the elevated listen rate, then the child BPD node 116 resets the listen rate to macLRepeatInterval. Accordingly, implementing the timer in this manner prevents the child BPD node 116 from operating at the elevated listen rate for an extended period of time. The method 500 then terminates at step 528. At step 512, if the child BPD node 116 determines that the listen rate should not be changed, then the method 500 terminates at step 528 without the child BPD node 116 resetting the listen rate.

The method 500 is implemented by a child BPD node 116 when that node needs to trigger a listen rate change to perform expedited communications. Typically, this situation can occur when the child BPD node 116 needs to perform an EAPOL procedure that must occur within a limited time window. However, the above technique can be applied to reduce network latency for a variety of other reasons, as well. A complimentary technique that is performed by a parent BPD node 116 when a child BPD node 116 initiates a listen rate change is described below in conjunction with FIG. 6.

Figure 6:
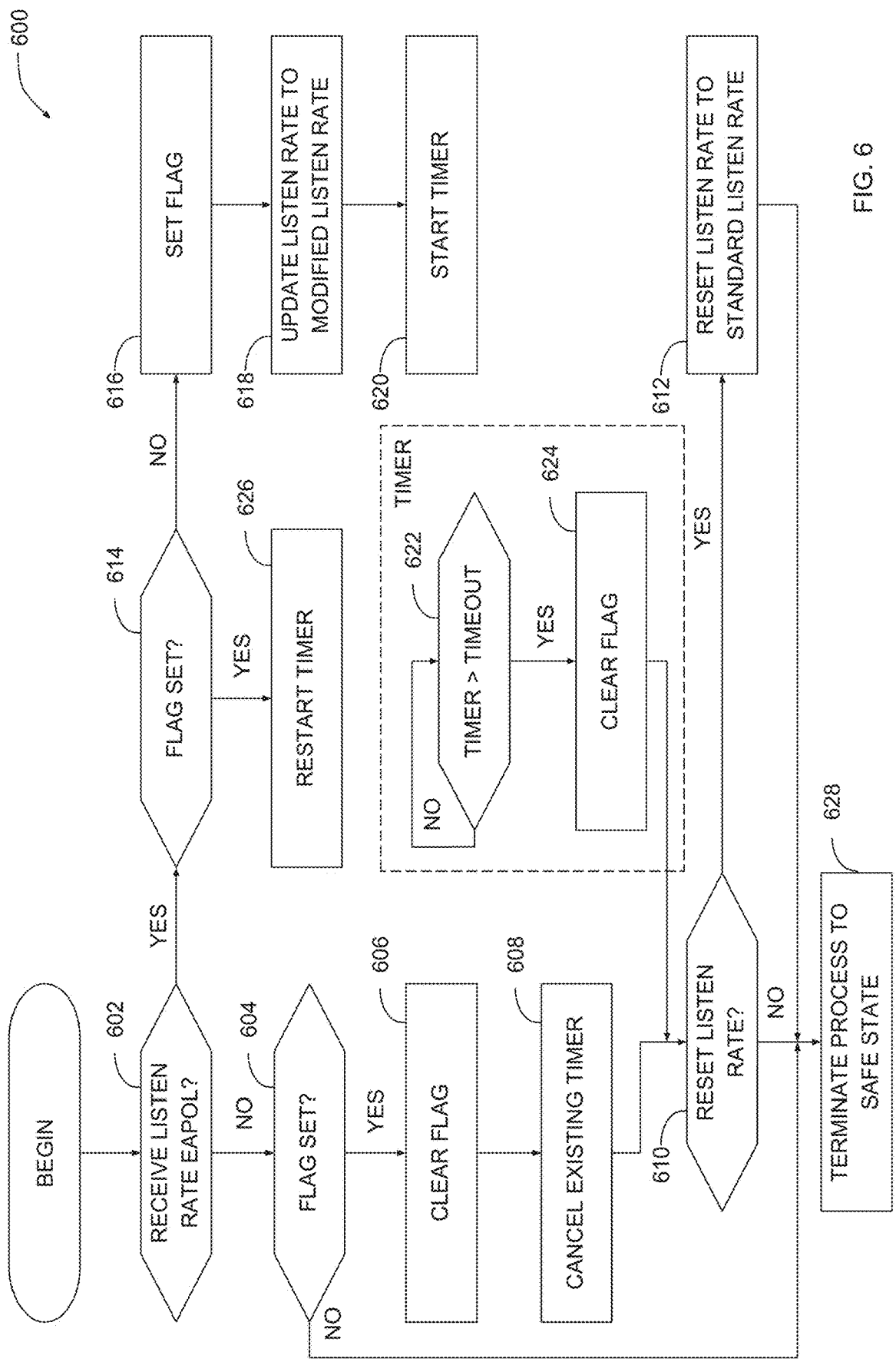
FIG. 6 is a flow diagram of method steps for changing the listen rate of a parent node in response to a trigger from a child node, according to various embodiments.

FIG. 6 is a flow diagram of method steps for changing the listen rate of a parent node in response to a trigger from a child node, according to various embodiments. Although the method steps are described in conjunction with the systems of FIGS. 1-4, persons skilled in the art will understand that any system configured to perform the method steps in any order falls within the scope of the present invention.

As shown, a method 600 begins at step 602, where a parent BPD node 116 determines whether an EAPOL message is received which includes an indication of a listen rate change. A child BPD node 116 may transmit an EAPOL message indicating the listen rate change in order to increase the listen rate of the parent BPD node 116. In doing so, the child BPD node 116 may implement the method 500 described above in conjunction with FIG. 5. If the parent BPD node 116 determines that the EAPOL message is received, then the method 600 proceeds to step 614.

At step 614, the parent BPD node 116 determines whether a flag is set. The flag could be, for example, flag 274 of FIG. 2. The flag is set when a timer is initiated to track how long the parent BPD node 116 operates with a modified listen rate. If the parent BPD node 116 determines at step 614 that the flag is set, then the method 600 proceeds to step 626 where the parent BPD node 116 restarts (or starts) the above-mentioned timer. The timer could be, for example, timer 272 of FIG. 2.

In one embodiment, the timer is implemented via steps 622 and 624 of the method 600. In this embodiment, step 622 repeats until the timer value exceeds a timeout value. Then, the method 600 proceeds to step 624, where the parent BPD node 116 clears the flag.

At step 614, if the parent BPD node 116 determines that the flag is not set, then the method 600 proceeds to step 616 where the parent BPD node 116 sets the flag. The purpose of the flag is to indicate that the timer is running. Then, at step 618, the parent BPD node 116 updates the current listen rate to the modified listen rate indicated in the EAPOL message. At step 620, the parent BPD node 116 starts the timer. The purpose of the timer is to control how long the parent BPD node 116 operates with the modified listen rate. The parent BPD node 116 implements steps 602, 614, 616, 618, and 620 to initialize the flag and the timer in response to a received EAPOL message. After performing the above-recited steps the parent BPD node 116 may return to and repeat step 602.

At step 602, the parent BPD node 116 again determines whether the EAPOL message is received. The EAPOL message has already been received, as discussed above, and so the method 600 proceeds to step 604. At step 604, the parent BPD node 116 determines whether the flag is set. If the flag is not set, meaning that the timer is not running, then the method 600 proceeds to step 628 and terminates. If the flag is set, meaning that the timer is still running, then the method 600 proceeds to step 606.

At step 606, the parent BPD node 116 clears the flag. At step 608, the parent BPD node 116 cancels the timer. The parent BPD node 116 performs these two steps to return the flag and the timer to an initial state in preparation for subsequent listen rate changes. The method 600 then proceeds to step 610. In embodiments where the timer is implemented via steps 622 and 624, as described above, expiry of the timer can also cause the method 600 to proceed to step 610.

At step 610, the parent BPD node 116 determines whether the listen rate should be reset to the initial listen rate. If the parent BPD node 116 determines that the listen rate should be reset, meaning that the timer has expired but the parent BPD node 116 still operates with a modified listen rate, then the method 600 proceeds to step 612. At step 612, the parent BPD node 116 resets the listen rate back to the standard listen rate. The method then terminates at step 628. If the parent BPD node 116 determines at step 610 that the listen rate should not be reset, that the listen rate already has been returned to the standard listen rate, then the method 600 terminates at step 628.

The method 600 is implemented by a parent BPD node 116 to control the amount of time that the parent BPD node 116 operates with a modified listen rate. This approach helps to avoid situations where the parent BPD node 116 increases the listen rate but fails to decrease the listen rate later and then loses connectivity with other adjacent nodes.

Referring generally to FIGS. 5-6, these two procedures are complimentary and implemented in conjunction with one another. As discussed, a child BPD node 116 implements the method 500, while a parent BPD node 116 of that child implements the method 600. Either node may implement the respective procedure using listen rate logic 270 shown in FIG. 2. In addition, the performance of these two procedures may propagate upstream across a plurality of intermediate nodes. For example, a parent BPD node 116 that implements the method 600 to increase listen rate could then implement the method 500 to propagate listen rate changes upstream.

One advantage of implementing these procedures is that the child BPD node 116 can temporarily reduce latency along a chain of intermediate nodes. Accordingly, the BPD node 116 may be able to complete an EAPOL procedure before that procedure times out. Another advantage is that any parent BPD node 116 can temporarily increase the listen rate in response to a child BPD node 116 yet return to the normal listen rate after a certain amount of time has elapsed.

Retaining Child Nodes During Temporary Network Disruptions

Referring back now to FIG. 4, BPD nodes 116 are configured to perform an additional technique in order to retain child nodes even after network access is lost. For example, BPD node 116(0), which acts as a parent to BPD node 116(1), could temporarily become disconnected from MPD 114(0) and lose network access. BPD node 116(0) could then perform the disclosed technique to retain BPD node 116(1) as a child node. Temporary disconnections may occur due to any number of different causes, including environmental causes as well as network-specific causes. For example, an automobile could temporarily park directly between BPD node 116(0) and MPD node 114(0), thereby disrupting a communication link between those two nodes. In another example, MPD node 114 could reboot at any given time and terminate a communication link with BPD 116(0).

Conventional nodes that reside within conventional networks typically abandon all child nodes when network access is lost. A given node abandons child nodes by terminating the transmission of beacons to those nodes, as mentioned above in conjunction with FIG. 2. When a child node is abandoned, the child node must repeat the discovery process to regain network access, which consumes excessive power and can limit the operational lifetime of the node. Conventional nodes abandon child nodes even when the loss of network access is brief, as well.

To address the above issues, BPD nodes 116 within PAN D that operate as parent nodes (such as BPD node 116(0)) set a timer when communication with an upstream parent node (such as MPD node 114(0)) is disrupted and network access is lost. While the timer is running, the parent BPD node 116 continues to transmit beacons to child BPD nodes (such as BPD node 116(1)) and continues to accept incoming transmissions from those child nodes. Conceptually, the parent BPD node 116 mimics normal operating conditions to prevent child nodes from initiating the discovery process until after the timer elapses.

Figure 7:
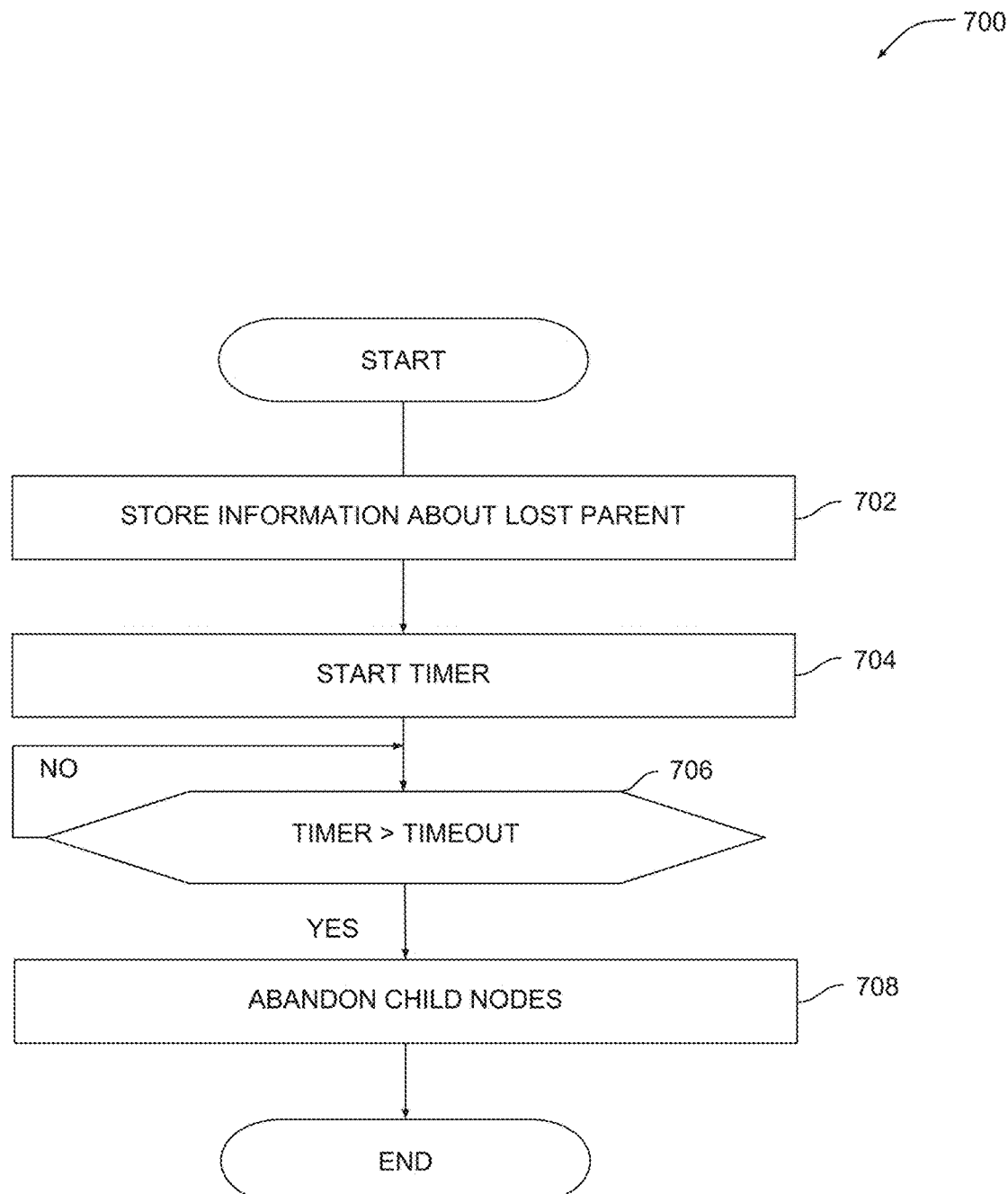
FIG. 7 is a flow diagram of method steps for selectively retaining child nodes when a parent node loses network access, according to various embodiments.
Figure 8:
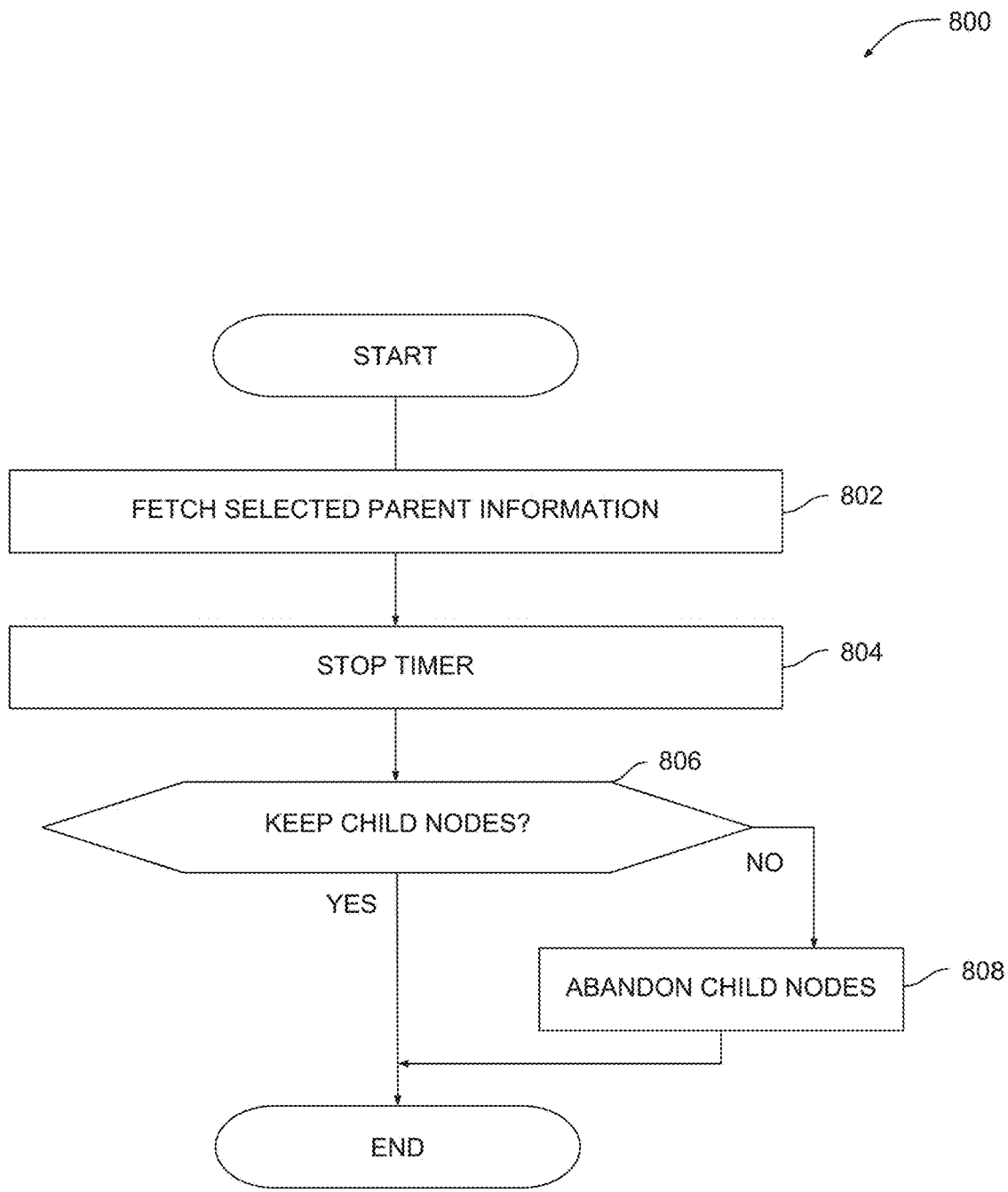
FIG. 8 is a flow diagram of method steps for selectively retaining child nodes when a parent node re-gains network access, according to various embodiments.

If the parent BPD node 116 fails to regain network access before the timer elapses, then the child BPD nodes 116 are abandoned. If network access is regained before the timer elapses, though, then the parent BPD node 116 determines whether network conditions permit the child BPD nodes to be retained. In some cases, the parent BPD node 116 regains network access through a different border router 112 and must then obtain a new network address. When this occurs, the parent BPD node 116 abandons any child BPD nodes 116 so that those nodes can obtain new network addresses as well. In other cases, the parent BPD node 116 regains network access through the same border router 112 or through a border router within the same PAN. The parent BPD node 116 may then retain the child BPD nodes 116, thereby preventing those nodes from needing to repeat discovery. FIG. 7 sets forth a procedure implemented by a parent BPD node 116 upon losing network access to selectively abandon child BPD nodes based on a timer. FIG. 8 sets forth a procedure implemented by the parent BPD node 116 upon regaining network access to selectively abandon child BPD based on network conditions.

FIG. 7 is a flow diagram of method steps for selectively retaining child nodes when a parent node loses network access, according to various embodiments. Although the method steps are described in conjunction with the systems of FIGS. 1-4, persons skilled in the art will understand that any system may be configured to perform the method steps in any order.

As shown, a method 700 begins at step 702, where a parent BPD node 116 stores information associated with the lost parent BPD node 116. For example, BPD node 116(0), upon losing a connection to MPD node 114(0), could store the MAC address of MPD node 114(0). The stored information allows the parent BPD node 116 to determine whether any child BPD nodes 116 can be retained when network access is regained, as described in greater detail below in conjunction with FIG. 8.

At step 704, the parent BPD node 116 starts a timer. The timer keeps track of the amount of time that has elapsed since the parent BPD node 116 lost network access. Once the timer is set, the method 700 proceeds to step 706. The parent BPD node 116 then repeats step 706 until the timer exceeds a timeout value. The timeout value represents the maximum allowable amount of time that the child BPD nodes 116 can be denied network access. During the time when the timer is running, the parent BPD node 116 continues to transmit beacons to the child BPD nodes 116. As long as a given child BPD node 116 receives these beacons, that node will not initiate the discovery process. In one embodiment, the timeout value represents a period of 24 hours. When the timer value exceeds the timeout value, then the method 700 proceeds to step 708. At step 708, the parent BPD node 116 abandons all child BPD nodes 116. In doing so, the parent BPD node 116 terminates the transmission of beacons to the child BPD nodes. Those child BPD nodes then initiate the discovery process and attempt to locate a new parent node that can provide network access.

Under some circumstances, the parent BPD node 116 is able to reconnect to an upstream parent node (such as an MPD node) and regain network access before the timer exceeds the timeout value. The child BPD nodes 116 may then continue to operate without needing to repeat discovery. However, depending on the system architecture, the child BPD nodes 116 may still need to be abandoned if the parent BPD node 116 regains network access through a different border router 112 or a different PAN, as described in greater detail below in conjunction with FIG. 8.

FIG. 8 is a flow diagram of method steps for selectively retaining child nodes when a parent node re-gains network access, according to various embodiments. Although the method steps are described in conjunction with the systems of FIGS. 1-4, persons skilled in the art will understand that any system may be configured to perform the method steps in any order.

As shown, a method 800 begins at step 802, where the parent BPD node 116 fetches information associated with an upstream parent node. The upstream parent node could be, for example, an MPD node 114 or a border router node 112. In addition, the upstream parent node could have been previously connected to the parent BPD node 116. At step 804, the parent BPD node 116 stops the timer. The timer measures how long the parent BPD node 116 lacks network access. Accordingly, when network access is regained, the BPD node 116 stops the timer in response.

At step 806, the parent BPD node 116 determines whether all child BPD nodes 116 should be retained or abandoned. As a general matter, the child BPD nodes 116 need not be abandoned when the parent BPD node 116 reconnects to the same parent node that previously provided network access. However, if the parent BPD node 116 connects to a node outside the network where the parent BPD node 116 resides, then the network addresses assigned to the child BPD nodes 116 may be invalid. In such situations, those child nodes need to repeat discovery to obtain valid addresses. If the parent BPD node 116 determines at step 806 that the child nodes should not be kept, then the method 800 proceeds to step 808 and the child nodes are abandoned. In one embodiment, the parent BPD node 116 stops transmitting time sync beacons and, in response to not receiving these beacons, the child BPD nodes 116 initiate discovery. If the parent BPD node 116 determines at step 806 that the child nodes should be kept, then the method 800 terminates.

Via the methods 700 and 800, a given parent BPD node 116 prevents child BPD nodes 116 from being required to repeat discovery despite a temporary loss of network access. The disclosed techniques thereby allow the child BPD nodes 116 to conserve limited battery power, potentially extending the operational lifetime of those nodes.

In sum, a BPD node is configured to cascade listening rate changes upstream to one or more intermediate nodes. The BPD node transmits an authentication message to a parent BPD node indicating the listening rate change. The BPD node sets a timer and waits for an acknowledgement from the parent BPD node. If the BPD node receives the acknowledgement, then the BPD and the parent BPD node change listening rate to permit low-latency communications. In addition, if the parent BPD node loses network access, the parent BPD node sets a timer and then waits to abandon any child BPD nodes until after the timer elapses.

At least one advantage of these techniques is that BPD nodes can reduce network latency sufficiently to allow the completion of authentication procedures that must be performed within a limited time span. Another advantage is that parent BPD nodes do not abandon child nodes immediately upon losing network access, thereby preventing those nodes from needing to unnecessarily repeat the discovery process. Accordingly, the disclosed techniques provide multiple advancements over the prior art.

1. Some embodiments include a computer-implemented method for increasing listen rates of nodes within a wireless mesh network to reduce communication latencies, the method comprising determining that a latency associated with communications across a plurality of intermediate nodes within the wireless mesh network should be reduced, in response to determining that the latency should be reduced, increasing a first listen rate of a first node within the wireless mesh network from a first value to a second value, transmitting a first packet to a first intermediate node included in the plurality of intermediate nodes, wherein the first packet indicates the second value and causes the first intermediate node to increase an associated listen rate from the first value to the second value, and executing a packet exchange across the plurality of intermediate nodes, wherein increasing the second listen rate reduces the latency associated with communications across the plurality of intermediate nodes.

2. The computer-implemented method of clause 1, wherein determining that the latency should be reduced comprises determining that the packet exchange across the plurality of nodes should be performed within a first time interval.

3. The computer-implemented method of any of clauses 1 and 2, wherein the first packet comprises an authentication request that includes a header indicating that the second listen rate should be increased to the second value.

4. The computer-implemented method of any of clauses 1, 2, and 3, wherein the first packet comprises an extensible authentication protocol over local area network (EAPOL) packet, and wherein the packet exchange comprises an EAPOL exchange between the first node and a network management entity.

5. The computer-implemented method of any of clauses 1, 2, 3, and 4, further comprising setting a first timer in response to transmitting the first packet, determining that the first timer has exceeded a first timeout value, and decreasing the first listen rate of the first node from the second value to the first value.

6. The computer-implemented method of any of clauses 1, 2, 3, 4, and 5, further comprising causing the first intermediate node to transmit one or more additional packets to one or more intermediate nodes included in the plurality of intermediate nodes, wherein each of the one or more additional packets indicates the second value and causes an intermediate node to increase an associated listen rate from the first value to the second value.

7. The computer-implemented method of any of clauses 1, 2, 3, 4, 5, and 6, wherein the first node is coupled to the wireless mesh network via the first intermediate node, and further comprising determining that the first node is no longer coupled to the wireless mesh network, incrementing a first timer one or more times, and periodically transmitting beacons to one or more child nodes coupled to the first node while the first timer increments the one or more times.

8. The computer-implemented method of any of clauses 1, 2, 3, 4, 5, 6, and 7, wherein periodically transmitting the beacons to the one or more child nodes causes the one or more child nodes to not perform a discovery process.

9. The computer-implemented method of any of clauses 1, 2, 3, 4, 5, 6, 7, and 8, further comprising determining that the first timer has exceeded a threshold value, and terminating beacon transmissions to the one or more child nodes.

10. The computer-implemented method of any of clauses 1, 2, 3, 4, 5, 6, 7, 8, and 9, further comprising determining that the first node has been assigned a network address that differs from a previous network address assigned to the first node, and terminating beacon transmissions to the one or more child nodes.

11. Some embodiments include a non-transitory computer-readable medium storing program instructions that, when executed by a processor, cause the processor to increase listen rates of nodes within a wireless mesh network to reduce communication latencies by performing the steps of determining that a latency associated with communications across a plurality of intermediate nodes within the wireless mesh network should be reduced, in response to determining that the latency should be reduced, increasing a first listen rate of a first node within the wireless mesh network from a first value to a second value, transmitting a first packet to a first intermediate node included in the plurality of intermediate nodes, wherein the first packet indicates the second value and causes the first intermediate node to increase an associated listen rate from the first value to the second value, and executing a packet exchange across the plurality of intermediate nodes, wherein increasing the second listen rate reduces the latency associated with communications across the plurality of intermediate nodes.

12. The non-transitory computer-readable medium of clause 11, wherein the step of determining that the latency should be reduced comprises determining that the packet exchange across the plurality of nodes should be performed within a first time interval to prevent an authentication procedure from timing out.

13. The non-transitory computer-readable medium of any of clauses 11 and 12, wherein the first packet comprises an extensible authentication protocol over local area network (EAPOL) packet that includes the second value within a header field.

14. The non-transitory computer-readable medium of any of clauses 11, 12, and 13, further comprising the steps of setting a first timer in response to transmitting the first packet, determining that the first timer has exceeded a first timeout value, and decreasing the first listen rate of the first node from the second value to the first value.

15. The non-transitory computer-readable medium of any of clauses 11, 12, 13, and 14, wherein the first node is coupled to the wireless mesh network via the first intermediate node, and further comprising the steps of determining that the first node is no longer coupled to the wireless mesh network, incrementing a first timer one or more times, periodically transmitting beacons to one or more child nodes coupled to the first node while the first timer increments the one or more times, wherein periodically transmitting the beacons to the one or more child nodes causes the one or more child nodes to not perform a discovery process, determining that the first node has been assigned a network address that differs from a previous network address assigned to the first node, and terminating beacon transmissions to the one or more child nodes.

16. Some embodiments include a system, including a plurality of intermediate nodes included in a wireless mesh network, a first intermediate node included in the plurality of nodes, and a first node coupled to the first intermediate node and configured to perform the steps of determining that a latency associated with communications across the plurality of intermediate nodes should be reduced, in response to determining that the latency should be reduced, increasing a first listen rate of the first node from a first value to a second value, transmitting a first packet to the first intermediate node, wherein the first packet indicates the second value and causes the first intermediate node to increase an associated listen rate from the first value to the second value, and executing a packet exchange across the plurality of intermediate nodes, wherein increasing the second listen rate reduces the latency associated with communications across the plurality of intermediate nodes.

17. The system of clause 16, wherein the packet exchange comprises an extensible authentication protocol over local area network (EAPOL) packet exchange that is performed between the first node and a network management entity to authenticate communications performed by the first node via the plurality of intermediate nodes.

18. The system of any of clauses 16 and 17, wherein the first node decreases the first listen rate from the second value to the first value in response to determining that a first timer has exceeded a first threshold value, and wherein the first intermediate node decreases the associated listen rate from the second value to the first value in response to determining that a second timer has exceeded a second threshold value.

19. The system of any of clauses 16, 17, and 18, wherein the first node is coupled to the wireless mesh network via the first intermediate node, and further comprising determining that the first node is no longer coupled to the wireless mesh network, incrementing a first timer one or more times, periodically transmitting beacons to one or more child nodes coupled to the first node while the first timer increments the one or more times, wherein periodically transmitting the beacons to the one or more child nodes causes the one or more child nodes to not perform a discovery process, determining that the first node has been assigned a network address that differs from a previous network address assigned to the first node, and terminating beacon transmissions to the one or more child nodes.

20. The system of any of clauses 16, 17, 18, and 19, wherein the first node includes a memory storing a software application, and a processor that, upon executing the software application, is configured to perform the steps of determining that the latency should be reduced, increasing the first listen rate, transmitting the first packet to the first intermediate node, and executing the packet exchange across the plurality of intermediate nodes.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for increasing listen rates of nodes within a wireless mesh network to reduce communication latencies, the method comprising:
  determining, by a first child node within the wireless mesh network, that a latency associated with communications across a plurality of parent nodes within the wireless mesh network should be reduced, wherein the first child node is downstream from the plurality of parent nodes relative to an access point within the wireless mesh network;

increasing, by the first child node and in response to determining that the latency should be reduced, a first listen rate associated with the first child node from a first value to a second value, wherein the first listen rate represents a periodicity at which the first child node listens for communications within the mesh network;

transmitting, by the first child node, a first packet to a first parent node included in the plurality of parent nodes, wherein the first packet indicates the second value and causes the first parent node to increase an associated listen rate from the first value to the second value; and causing a packet exchange to be executed across the plurality of parent nodes, wherein increasing the first listen rate reduces the latency associated with communications across the plurality of parent nodes.

2. The computer-implemented method of claim 1, wherein determining that the latency should be reduced comprises determining that the packet exchange across the plurality of parent nodes should be performed within a first time interval.

3. The computer-implemented method of claim 1, wherein the first packet comprises an authentication request that includes a header indicating that the associated listen rate should be increased to the second value.

4. The computer-implemented method of claim 1, wherein the first packet comprises an extensible authentication protocol over local area network (EAPOL) packet, and wherein the packet exchange comprises an EAPOL exchange between the first child node and a network management entity.

5. The computer-implemented method of claim 1, further comprising:
  setting a first timer in response to transmitting the first packet;
  determining that the first timer has exceeded a first timeout value; and
  decreasing the first listen rate of the first child node from the second value to the first value.

6. The computer-implemented method of claim 1, further comprising causing the first parent node to transmit one or more additional packets to one or more parent nodes included in the plurality of parent nodes, wherein each of the one or more additional packets indicates the second value and causes a parent node to increase an associated listen rate from the first value to the second value.

7. The computer-implemented method of claim 1, wherein the first child node is coupled to the wireless mesh network via the first parent node, and further comprising:
  determining that the first child node is no longer coupled to the wireless mesh network;
  incrementing a first timer one or more times; and
  periodically transmitting beacons to one or more further child nodes relative to the first child node while the first timer increments the one or more times.

8. The computer-implemented method of claim 7, wherein periodically transmitting the beacons to the one or more further child nodes causes the one or more further child nodes to not perform a discovery process.

9. The computer-implemented method of claim 7, further comprising:
  determining that the first timer has exceeded a threshold value; and
  terminating beacon transmissions to the one or more further child nodes.

10. The computer-implemented method of claim 7, further comprising:
  determining that the first child node has been assigned a network address that differs from a previous network address assigned to the first child node; and
  terminating beacon transmissions to the one or more further child nodes.

11. One or more non-transitory computer-readable media storing program instructions that, when executed by one or more processors, cause the one or more processors to increase listen rates of nodes within a wireless mesh network to reduce communication latencies by performing the steps of:
  determining, by a first child node within the wireless mesh network, that a latency associated with communications across a plurality of parent nodes within the wireless mesh network should be reduced, wherein the first child node is downstream from the plurality of parent nodes relative to an access point within the wireless mesh network;
  increasing, by the first child node and in response to determining that the latency should be reduced, a first listen rate associated with the first child node from a first value to a second value, wherein the first listen rate represents a periodicity at which the first child node listens for communications within the mesh network;
  transmitting, by the first child node, a first packet to a first parent node included in the plurality of parent nodes, wherein the first packet indicates the second value and causes the first parent node to increase an associated listen rate from the first value to the second value; and
  causing a packet exchange to be executed across the plurality of parent nodes, wherein increasing the first listen rate reduces the latency associated with communications across the plurality of parent nodes.

12. The non-transitory computer-readable medium of claim 11, wherein the step of determining that the latency should be reduced comprises determining that the packet exchange across the plurality of parent nodes should be performed within a first time interval to prevent an authentication procedure from timing out.

13. The non-transitory computer-readable medium of claim 11, wherein the first packet comprises an extensible authentication protocol over local area network (EAPOL) packet that includes the second value within a header field.

14. The non-transitory computer-readable medium of claim 11, further comprising the steps of:
  setting a first timer in response to transmitting the first packet;
  determining that the first timer has exceeded a first timeout value; and
  decreasing the first listen rate of the first child node from the second value to the first value.

15. The non-transitory computer-readable medium of claim 11, wherein the first child node is coupled to the wireless mesh network via the first parent node, and further comprising the steps of:
  determining that the first child node is no longer coupled to the wireless mesh network;
  incrementing a first timer one or more times;
  periodically transmitting beacons to one or more further child nodes relative to the first child node while the first timer increments the one or more times, wherein periodically transmitting the beacons to the one or more further child nodes causes the one or more further child nodes to not perform a discovery process;

determining that the first child node has been assigned a network address that differs from a previous network address assigned to the first child node; and terminating beacon transmissions to the one or more further child nodes.

16. A system, including:
a plurality of parent nodes included in a wireless mesh network;
a first parent node included in the plurality of parent nodes; and
a first child node coupled to the first parent node, wherein the first child node is downstream from the plurality of parent nodes relative to an access point within the wireless mesh network and configured to perform the steps of:
   determining that a latency associated with communications across the plurality of parent nodes should be reduced,
   in response to determining that the latency should be reduced, increasing, by the first child node, a first listen rate of the first child node from a first value to a second value, wherein the first listen rate represents a periodicity at which the first child node listens for communications,
   transmitting, by the first child node, a first packet to the first parent node, wherein the first packet indicates the second value and causes the first parent node to increase an associated listen rate from the first value to the second value, and
   causing a packet exchange to be executed across the plurality of parent nodes, wherein increasing the first listen rate reduces the latency associated with communications across the plurality of parent nodes.

17. The system of claim 16, wherein the packet exchange comprises an extensible authentication protocol over local area network (EAPOL) packet exchange that is performed between the first child node and a network management entity to authenticate communications performed by the first child node via the plurality of parent nodes.

18. The system of claim 16, wherein the first child node decreases the first listen rate from the second value to the first value in response to determining that a first timer has exceeded a first threshold value, and wherein the first parent node decreases the associated listen rate from the second value to the first value in response to determining that a second timer has exceeded a second threshold value.

19. The system of claim 16, wherein the first child node is coupled to the wireless mesh network via the first parent node, and further comprising:
   determining that the first child node is no longer coupled to the wireless mesh network;
   incrementing a first timer one or more times;
   periodically transmitting beacons to one or more further child nodes relative to the first child node while the first timer increments the one or more times, wherein periodically transmitting the beacons to the one or more further child nodes causes the one or more further child nodes to not perform a discovery process;
   determining that the first child node has been assigned a network address that differs from a previous network address assigned to the first child node; and
   terminating beacon transmissions to the one or more further child nodes.

20. The system of claim 16, wherein the first child node includes:
   a memory storing a software application; and
   a processor that, upon executing the software application, is configured to perform the steps of:
      determining that the latency should be reduced,
      increasing the first listen rate,
      transmitting the first packet to the first parent node, and
      executing the packet exchange across the plurality of parent nodes.

* * * * *